United States Patent
Jouve

(10) Patent No.: US 10,870,483 B2
(45) Date of Patent: Dec. 22, 2020

(54) ANTI-VIBRATION SUSPENSION DEVICE FOR A MECHANICAL ELEMENT, AND AN AIRCRAFT

(71) Applicant: AIRBUS HELICOPTERS, Marignane (FR)

(72) Inventor: Jeremy Jouve, Senas (FR)

(73) Assignee: AIRBUS HELICOPTERS, Marignane (FR)

(*) Notice: Subject to any disclaimer, the term of this patent is extended or adjusted under 35 U.S.C. 154(b) by 212 days.

(21) Appl. No.: 15/920,647

(22) Filed: Mar. 14, 2018

(65) Prior Publication Data

US 2018/0265187 A1 Sep. 20, 2018

(30) Foreign Application Priority Data

Mar. 16, 2017 (FR) .................................... 17 70256

(51) Int. Cl.
*B64C 27/00* (2006.01)
*F16F 7/10* (2006.01)
(Continued)

(52) U.S. Cl.
CPC ............ *B64C 27/001* (2013.01); *F16F 7/104* (2013.01); *F16F 7/1005* (2013.01);
(Continued)

(58) Field of Classification Search
CPC .......... B64C 27/001; B64C 2027/002; B64C 2027/005; B64C 2027/004; F16F 7/1005; F16F 7/116; F16F 7/104; F16F 2228/04; F16F 2222/08; F16F 2230/18; F16F 15/00; F16F 7/1011
See application file for complete search history.

(56) References Cited

U.S. PATENT DOCUMENTS 4,405,101 A 9/1983 Carlson et al.
5,620,068 A * 4/1997 Garnjost .............. B60G 17/018
188/378

(Continued)

FOREIGN PATENT DOCUMENTS

EP 1531372 A1 5/2005
FR 2739670 A1 4/1997
(Continued)

OTHER PUBLICATIONS

French Search Report for French Application No. FR1770256, Completed by the French Patent Office, dated Dec. 19, 2017, 7 pages.

*Primary Examiner* — Medhat Badawi
*Assistant Examiner* — Vicente Rodriguez
(74) *Attorney, Agent, or Firm* — Brooks Kushman P.C.

(57) ABSTRACT

A suspension device provided with at least one suspension means. The suspension means comprise a tuned mass damper, the damper comprising an inertial mass carried by a mass support. The suspension means include at least a first actuator generating a dynamic force for acting on the swinging motion of the damper. The inertial mass being movable longitudinally in translation relative to the mass support, the suspension device including a second actuator connected to the inertial mass to move the inertial mass longitudinally relative to the mass support.

20 Claims, 3 Drawing Sheets

(51) Int. Cl.
  *F16F 7/104* (2006.01)
  *F16F 7/116* (2006.01)
(52) U.S. Cl.
  CPC ............ *F16F 7/1011* (2013.01); *F16F 7/116* (2013.01); *B64C 2027/002* (2013.01); *B64C 2027/004* (2013.01); *B64C 2027/005* (2013.01); *F16F 2222/08* (2013.01); *F16F 2228/04* (2013.01); *F16F 2230/18* (2013.01)

(56) References Cited

U.S. PATENT DOCUMENTS

| | | | | |
|---|---|---|---|---|
| 5,813,626 A | * | 9/1998 | Zoppitelli | B64C 27/001 244/17.13 |
| 5,814,963 A | * | 9/1998 | Girard | F16F 7/1005 318/460 |
| 6,954,686 B2 | | 10/2005 | Aubourg et al. | |
| 8,272,592 B2 | * | 9/2012 | Badre-Alam | B64C 27/001 244/17.13 |
| 8,616,353 B2 | | 12/2013 | Manfredotti | |
| 9,296,476 B2 | * | 3/2016 | Seifert | B64C 27/001 |
| 9,592,909 B2 | * | 3/2017 | Cranga | F16F 15/02 |
| 2013/0233998 A1 | | 9/2013 | Bueter et al. | |
| 2013/0311012 A1 | * | 11/2013 | Black | B64C 27/001 701/3 |
| 2018/0022447 A1 | | 1/2018 | Bocoviz et al. | |

FOREIGN PATENT DOCUMENTS

| | | |
|---|---|---|
| FR | 2747098 A1 | 10/1997 |
| FR | 2961570 A1 | 12/2011 |
| FR | 3010386 A1 | 3/2015 |
| FR | 3054277 A1 | 1/2018 |
| WO | 2006083295 A1 | 8/2006 |
| WO | 2012106616 A1 | 8/2012 |

* cited by examiner

ANTI-VIBRATION SUSPENSION DEVICE FOR A MECHANICAL ELEMENT, AND AN AIRCRAFT

CROSS-REFERENCE TO RELATED APPLICATIONS

This application claims priority to French patent application No. FR 1770256 filed on Mar. 16, 2017, the disclosure of which is incorporated in its entirety by reference herein.

BACKGROUND OF THE INVENTION

(1) Field of the Invention

The present invention relates to an anti-vibration suspension device for a mechanical element, in particular an aircraft. The present invention relates to mechanisms seeking to reduce a level of vibration. In particular, the invention applies to mechanisms for aircraft, such as rotorcraft, for example.

2) Description of Related Art

Specifically, rotorcraft are by their nature subjected to vibration, in particular as generated in natural manner by a rotary wing of the rotorcraft.

In order at least to limit such vibration, an anti-vibration suspension device may comprise a resonator type vibration absorber. A resonator produces an antiresonance effect at a frequency referred to as the "antiresonance frequency".

A resonator conventionally comprises a tuned mass damper that is provided with a mass referred to as an "inertial mass", carried by a mass support. The mass support is then connected to a vibratory structure and to a structure that is to be isolated, and may be coupled to a flexible connection. When the vibratory structure is subjected to vibration, the resonator is thus excited by the vibratory structure. This causes the inertial mass of the damper to move for the purpose of countering the vibration of the vibratory structure.

In order to optimize the efficiency of the resonator, the antiresonance frequency of the resonator is tuned to the dynamic excitation frequency of the vibratory structure that is to be damped, referred more simply as the "excitation frequency". When the vibratory structure is excited, the inertial mass vibrates, thereby reducing the level of vibration exerted on the structure that is to be isolated.

For example, rotorcraft have at least one main rotor connected to an airframe. The main rotor contributes to providing the aircraft with at least part of its lift and possibly also propulsion.

The main rotor is driven in rotation by a power plant having at least one engine that is mechanically connected to a main power transmission gearbox (MGB). The MGB is also provided with a rotor mast that is connected to the head of the main rotor. Under such circumstances, at least one engine drives the MGB, which in turn drives rotation of the main rotor.

The MGB is fastened to a platform, referred to as the "transmission support platform", of the airframe by fastener elements. Such fastener elements may include suspension bars, each hinged to a high point of the MGB.

Under such circumstances, a resonator may be interposed between each suspension bar and the support platform. For example, such resonator comprises an inertial mass that is carried by a mass support. The mass support extends longitudinally from a first end carrying the inertial mass to a second end. The second end may be connected directly or indirectly firstly to a suspension bar and secondly to the support platform.

Furthermore, the resonator may include a resilient member that provides stiffness, and in particular a spring blade.

Thus, the mass support is fastened by way of example to a resilient blade that is hinged to the MGB.

In other variants, other types of resilient member are employed, such as an element operating in torsion, for example.

When the MGB is subjected to excitation at excitation frequencies $kb\Omega$ that are multiples of the frequency of rotation $\Omega$ of the rotor and also of the number of blades b and of an integer k, the damper performs vibratory motion. This vibratory motion tends to generate antiresonance at the excitation frequency tending to cancel out locally the dynamic forces involved.

With a "passive" resonator, the inertial mass is held stationary in flight relative to the mass support.

One of the difficulties raised by such a resonator lies in optimally adjusting the system so that the antiresonance frequency is particularly effective in producing the desired effects.

With a passive resonator, the inertial mass is secured to the mass support. The resonator can be adjusted on the ground by modifying specifically the mass of the inertial mass, or else its position on the mass support. The adjustment is made as a compromise between various flight conditions and/or various configurations of the aircraft, in order to tend towards acceptable performance over the entire flight envelope.

Specifically, the system is effective at a given excitation frequency, e.g. $b\Omega$. Nevertheless, the excitation frequency can vary as a function of various flight configurations of a rotorcraft. In particular, the variation may take place over a period that is considerably greater than the excitation period.

Such adjustment of a passive resonator is thus difficult to perform on rotorcraft that have a rotor with a speed of rotation that is variable.

Like any resonant system, the resonator may possess a relatively narrow frequency range for amplification and antiresonance. Thus, a small offset between the antiresonance frequency and the excitation frequency of the rotor, e.g. caused by a variation in the speed of rotation of the main rotor, can reduce the effectiveness of the resonator.

Certain resonators are said to be "semi-active". Compared with a passive resonator, the inertial mass is made to be movable relative to the mass support along a "longitudinal" main direction of the mass support. A single actuator can thus move the inertial mass in translation along the mass support in order to modify the lever arm of the damper.

In flight, a semi-active resonator makes it possible to move the inertial mass in translation relative to a damper so as to enable the resonator to process vibratory phenomena that occur at various different frequencies.

The resonator is thus adjusted by moving the inertial mass in translation, which mass is movable along the mass support. This movement serves in particular to modify the position of the center of gravity of the resonator, and to modify the vibratory response of the resonator when excited.

Document FR 2 961 570 proposes a resonator having a main mass and an auxiliary mass that are mounted on a support. The auxiliary mass is arranged in a casing that is fastened to the main mass. The auxiliary mass has a threaded member arranged around a drive screw inside the casing. Manual drive means engaged with the drive screw enable the drive screw to be turned so as to move the auxiliary mass in translation along the drive screw.

Document FR 2 739 670 describes a resonator having an adjustment mass that is movable in translation. The adjustment mass comprises two subassemblies on a common axis.

The adjustment mass is guided to move in translation by pads pushed by springs against a casing. The pads extend along a generator line of the adjustment mass, i.e. substantially parallel to the axis along which the adjustment mass moves in translation.

According to Document FR 3 054 277, a resonator is provided with a heavy member comprising a casing fastened to a resilient blade. The heavy member comprises a set of masses that is movable in translation in said casing along a longitudinal direction. A wormscrew driven by drive means is engaged in a slider nut of said set of masses. The set of masses comprises two masses sliding respectively in two cylindrical spaces of the casing. Each mass presents at least two presser means interposed between the mass and the casing, each presser means having a groove arranged in a circumference of a mass, each presser means having at least one resilient member arranged in said groove and a spilt ring pressed against the casing by said at least one resilient member of the presser means.

Documents FR 2 747 098 and U.S. Pat. No. 4,405,101 both describe devices, each having an inertial mass that can be moved in translation.

Independently of the way it is embodied, a semi-active resonator enables the inertial mass to be moved on the support mass. Such movement serves to modify the geometry of the resonator so as to urge the antiresonance frequency towards the excitation frequency of the vibratory structure connected to the resonator.

A semi-active resonator then makes it possible to counter excitation that is produced at various different frequencies. Nevertheless, the semi-active resonator behaves essentially as a passive resonator of adjustment that can be adapted under quasi-steady conditions. That passive mode of operation can limit the isolation performance of that resonator, even when it is optimally adjusted.

Certain resonators are said to be "active". The inertial mass is stationary relative to the mass support of the damper. However, an active resonator includes an actuator that generates a dynamic force that is exerted on the damper. The movement of the damper is thus the result of first excitation caused by the vibratory structure that is connected to the resonator combined with second excitation caused by the actuator.

The dynamic force delivered by the actuator can serve to mitigate the loss of effectiveness associated with an offset between the antiresonance frequency and the excitation frequency of the vibratory structure connected to the resonator.

An active resonator makes it possible to achieve vibration-isolating performance that is advantageous, as a result of adding a dynamic force on the inertial damper.

Nevertheless, the energy that needs to be delivered to the actuator in order to drive the damper can turn out to be very large, in particular in the presence of a large offset between the antiresonance frequency of the resonator and the excitation frequency of the vibratory structure.

Documents FR 3 010 386, WO 2012/106616, and WO 2006/083295 describe anti-vibration suspension devices having such active resonators.

Documents US 2013/233998 and EP 1 531 372 are also known, with Document US 2013/233998 presenting various resonators having respective actuators.

BRIEF SUMMARY OF THE INVENTION

An object of the present invention is thus to propose a suspension device comprising innovative suspension means of the resonator type.

The invention thus relates to an anti-vibration suspension device for a mechanical assembly, such as a main power transmission gearbox, for example.

The suspension device is provided with at least one suspension means, such as a resonator. The suspension means comprise a tuned mass damper performing swinging motion, the damper comprising a mass support that extends longitudinally, the mass support being for connecting directly or indirectly both to a carrier structure that is to be isolated, and also to said mechanical assembly, the tuned mass damper comprising an inertial mass carried by the mass support, the suspension means including at least a first actuator for generating dynamic forces for the purpose of generating a dynamic force to act on the swinging motion of the tuned mass damper, the suspension device having at least first calculation means for controlling the first actuator, the first calculation means being connected to a measurement system measuring a vibratory response in order to adjust the swinging motion.

Furthermore, the inertial mass is movable longitudinally in translation relative to the mass support, the suspension device including a second actuator that is connected to the inertial mass to move the inertial mass longitudinally relative to the mass support, the suspension device including second calculation means controlling said second actuator in order to adjust a position of the inertial mass relative to the mass support.

The term "tuned mass damper" or "damper" or "batteur" in French language are used in particular to designate a set of members that perform swinging motion under drive from the mechanical assembly. The damper comprises at least one mass support that carries an inertial mass either directly or indirectly.

The suspension means may also include a resilient element providing stiffness to the suspension means. For example, a spring blade type resilient element may extend between the damper and the mechanical assembly, or may be hinged to the carrier structure and also to the mechanical assembly while also carrying the damper.

The term "mass support" is used in particular to designate a longitudinally elongate member that performs swinging motion under drive from the mechanical assembly and/or indeed the first actuator. The mass support may be in the form of a lever, for example. The lever may comprise at least one solid bar or may comprise a plurality of members, e.g. constituting an H-shaped structure.

The term "inertial mass" is used to designate a heavy member comprising at least one solid carried by the mass support.

Furthermore, the first and second calculation means form distinct electronic members or they may form portions of the same piece of equipment. For example, the first and second calculation means may form respective electronic cards in a single computer, or they may form portions of a single electronic card, or indeed they may be represented by segments of code stored in a memory. The first and second calculators means can be named respectively "first calculator" and "second calculator".

Under such circumstances, the suspension means are provided with a first actuator that exerts a dynamic force on the damper, i.e. on the mass support and/or on the inertial mass, for example. The first actuator thus adjusts the swinging motion of the damper, i.e. the phase and/or the amplitude of the motion by applying a dynamic force on the damper.

The swinging movement of the damper then results both from first excitation caused by the mechanical assembly and also from second excitation caused by the first actuator.

Thus, as a result of this dynamic force applied to the damper, the first actuator serves to mitigate a loss of effectiveness of the suspension device of the invention associated with an offset between the antiresonance frequency of the suspension means and the excitation frequency of the mechanical assembly connected to the suspension device.

Furthermore, the suspension means include a second actuator that can move the inertial mass along the mass support, e.g. specifically along the main direction of the mass support.

By way of example, the first actuator may be nested in the inertial mass. The second actuator may be carried by the mass support. As a result, the second actuator can move part of the first actuator along the mass support while moving the inertial mass.

The suspension means can thus present the advantages of a semi-active resonator together with the advantages of an active resonator. Specifically, the first actuator can serve to improve the performance of the suspension by means of an active solution that is not present in a semi-active resonator. By way of example, the first calculation means may regulate the force exerted by the first actuator on the damper as a function of the level of vibration to which a cabin is subjected in order to optimize the comfort of its occupants. The second actuator may enable the position of the center of gravity of the damper to be adapted, e.g. in order to minimize the energy consumption of the first actuator.

Specifically, when the frequency of the vibration that is to be processed varies by a relatively large amount, the first actuator consumes a large amount of electrical energy in order to minimize such vibration. In order to reduce that energy consumption, the second actuator then moves the inertial mass along the mass support so as to minimize the forces that need to be generated by the second actuator.

For example, when the speed of rotation of a rotor that constitutes a source of vibration varies, the second actuator moves the inertial mass along the mass support. The energy that needs to be supplied to the first actuator in order to minimize the vibration is then itself minimized.

This architecture tends to correct both of the defects of conventional resonators. The poor performance of a semi-active resonator can be corrected by using a first actuator that represents an active portion of the system, possibly acting continuously. In addition, the energy consumed by the first actuator at the extremes of its range can be reduced compared with a conventional active resonator because of the optimum adjustment continuously provided by the second actuator in flight.

At first glance, incorporating two actuators, instead of only one of the prior art actuators, might tend to make this application difficult, in particular in terms of weight and size. Nevertheless, a resonator requires the use of a considerable inert mass, referred to as the "inertial mass", at the end of the mass support. The first actuator and the second actuator can themselves constitute a portion of this mass without representing dead weight. Furthermore, optimizing the function of the first actuator by using the second actuator serves to limit the energy consumed by the first actuator. The first actuator can thus potentially be under-dimensioned, compared with a conventional active resonator, thus making it possible to reduce its size.

Under such circumstances, the suspension means comprise a resonator having a first resonator that acts actively on the damper to minimize vibration, with the resonator also having a second actuator that moves an inertial mass along the mass support in order to minimize the energy consumption of the first actuator. This architecture differs from architectures making use of a single actuator, either for moving a mass in order to combat vibration over a wide frequency range, or else for generating a force on a damper.

The suspension device may also include one or more of the following characteristics, possibly in combination with one another.

For example, the first actuator may comprise a "movable" member and a "stationary" member, the movable member being integrated in the inertial mass so as to be constrained to move in translation with the inertial mass, and the stationary member being for arranging so that it does not swing with the mass support and the inertial mass.

The term "integrated" means that the movable member is a portion of the inertial mass. The term "movable" then refers to the movement of the inertial mass and thus of the movable member along the mass support. Conversely, the stationary member does not form part of the inertial mass and it does not move together with the inertial mass.

Under such circumstances, the first actuator acts on the damper via the inertial mass.

For example, the first actuator may comprise at least one magnetized member and at least one electric coil, the magnetized member or the coil being secured to the inertial mass.

For example, the coil is secured to an MGB and the magnetized member is a portion of the inertial mass. Thus, the inertial mass may comprise a magnetic solid or may comprise a non-magnetic solid together with at least one magnet.

The coil may comprise a solenoid that is provided with a winding of electrically conductive wires together with a core. The coil is powered electrically by an electric current determined under the control of the first calculation means.

For example, the inertial mass may comprise at least one solid that is longitudinally slidable along the coil, the solid including the magnetized member, and the magnetized member being positioned facing the coil.

Optionally, the solid may present at least one opening having a longitudinal segment of the coil pass therethrough.

The solid may slide along the direction in which the longitudinal segment extends, possibly without interfering with the longitudinal segment.

The opening may be longitudinally open in both directions, and may be defined by the inertial mass both transversely and in elevation.

For example, the at least one coil may describe a closed loop around an empty space, the at least one coil presenting two longitudinal segments connected together by two transverse branches, the solid presenting at least two openings separated transversely by a partition of the solid, the two longitudinal segments passing respectively through said two openings, and being arranged transversely on either side of the partition.

By way of example, the at least one coil may be O-shaped so as to pass through two distinct openings in the inertial mass.

Furthermore, a magnetized member may comprise a magnetized face of the inertial mass, and at least one said opening can be defined at least in part by at least one said magnetized face.

The inertial mass then has at least one magnetized face forming a movable and magnetized member of the first actuator facing the coil.

Furthermore, said at least one opening may extend in elevation over a minimum height and said coil may extend in elevation over a maximum dimension in elevation, said minimum height being greater than the sum of the maximum dimension in elevation plus a predetermined stroke in elevation for the mass support.

The term "minimum height" means the smallest height of the opening in an elevation direction substantially perpendicular to the travel direction of the inertial mass. Optionally, the opening may be constant in height.

The term "maximum dimension in elevation" means the greatest height of the coil in a direction in elevation that is substantially perpendicular to the travel direction of the inertial mass. The coil may optionally have a height that is constant.

Under such circumstances, the opening is taller than the coil in order to allow the damper to swing.

In another aspect, said at least one opening may extend longitudinally over a maximum length and said coil may extend longitudinally over a minimum longitudinal dimension, said minimum longitudinal dimension being greater than the sum of the maximum length plus a predetermined longitudinal stroke for the inertial mass.

The term "maximum length" designates the greatest length of the opening in a longitudinal direction substantially parallel to the travel direction of the inertial mass. The opening may optionally have a length that is constant.

The term "minimum longitudinal dimension" means the shortest length of the coil in a longitudinal direction that is substantially parallel to the travel direction of the inertial mass. The coil may optionally have a length that is constant.

Under such circumstances, the opening is shorter than the coil so as to allow the inertial mass to move along the mass support.

In another aspect, the inertial mass may comprise two solids co-operating respectively with two coils of the first actuator.

This characteristic can optimize guidance of the movement of the inertial mass.

In another aspect, the second actuator may comprise a motor connected by a screw-and-nut system to the inertial mass.

The term "screw-and-nut system" designates a system having a wormscrew and a nut. For example, the nut is secured to the inertial mass. The motor turning the wormscrew then causes the nut to move in translation along the wormscrew.

In another aspect, the second calculation means may be connected to a measurement unit, the measurement unit transmitting at least one data value to the second actuator representing a speed of rotation of a rotor exciting the mechanical assembly.

The position of the inertial mass relative to the mass support may result from the speed of rotation of a rotor.

In another aspect, the first calculation means may be configured to apply a minimizing algorithm that receives as input said vibratory response that is to be minimized by the algorithm, said vibratory response for minimizing being injected into said minimizing algorithm, and said minimizing algorithm delivering a first control signal for controlling said first actuator.

In addition or as an alternative, the second calculation means may be configured to apply and algorithm, e.g. a closed loop algorithm, delivering a control signal for the second actuator as a function of a speed of rotation of a rotor exciting said mechanical assembly.

By way of example, and in order to simplify the control algorithms, the second actuator may be controlled using an open loop via various parameters that thus serve to position the inertial mass relative to the mass support at an optimum position, without using a return loop that might potentially be destabilizing for the first actuator.

Alternatively, the second actuator may be controlled using a closed loop via a pre-established table of positions for the inertial mass as a function of the speed of rotation of the rotor. For each speed of rotation, a pre-established position is stored. This pre-established setpoint position is injected into a regulation loop and is compared with the current position of the inertial mass in order to generate an error signal that is transmitted to the second actuator.

The first actuator may optionally be controlled via a minimizing algorithm, e.g. the algorithm known by the term "FxLMS", for example.

These characteristics can give rise to an architecture that tends to avoid any risks of interference or instability between the control of the two actuators.

In another aspect, the suspension device may include a resilient element for providing stiffness between the mechanical assembly and the carrier structure.

For example, a spring blade type resilient element may be interposed between the damper and the MGB. A resilient element may also be arranged between the damper and the structure for damping.

In addition to a suspension, the invention provides an aircraft.

The aircraft is provided with a carrier structure and a mechanical assembly comprising a rotor and a main power transmission gearbox (MGB) driving the rotor in rotation, the mechanical assembly including at least one suspension bar extending from a high end hinged to the MGB to a low end.

The aircraft includes a suspension device of the invention, at least one low end of a suspension bar being hinged to suspension means of the suspension device.

For example, each suspension bar may be hinged to suspension means that are specific thereto.

BRIEF DESCRIPTION OF THE DRAWINGS

The invention and its advantages appear in greater detail from the following description of examples given by way of illustration with reference to the accompanying figures, in which.

Elements shown in more than one of the figures are given the same references in each of them.

DETAILED DESCRIPTION OF THE INVENTION

Figure 1:
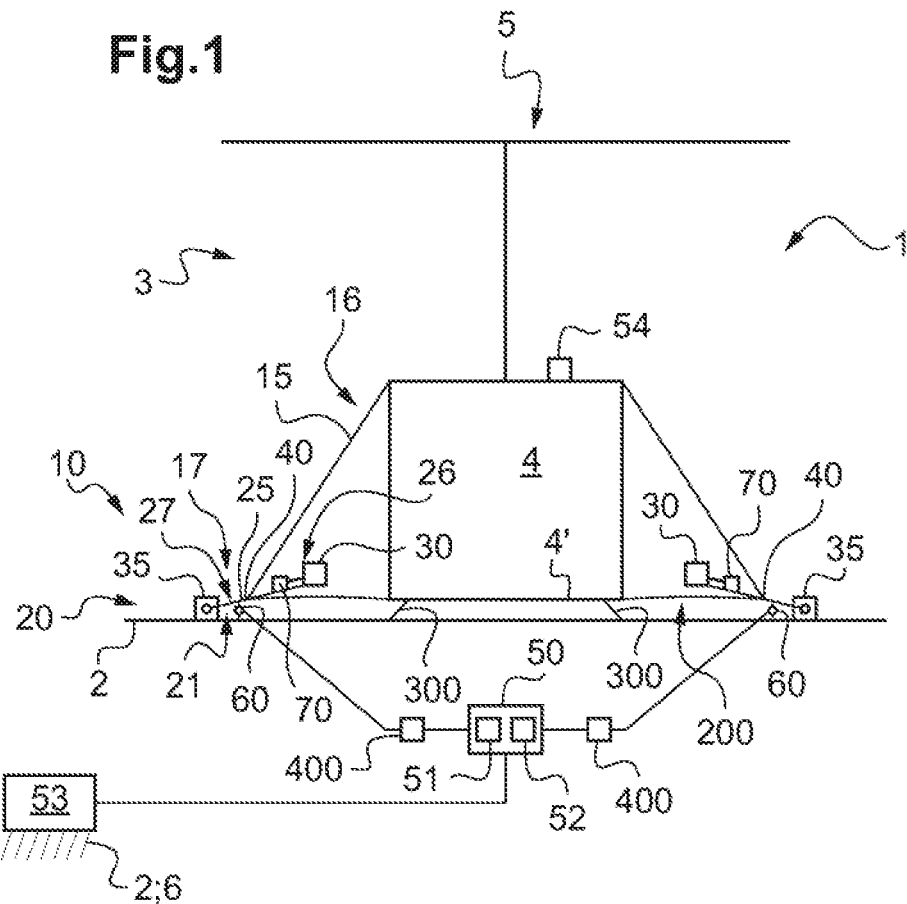
FIG. 1 is a diagram showing an aircraft provided with a suspension device.

FIG. 1 shows an aircraft 1 having a carrier structure 2. For example, the carrier structure 2 may be in the form of a platform.

Furthermore, the aircraft 1 has a mechanical assembly 3 fastened to the carrier structure 2 in particular for the purpose of contributing to providing the aircraft 1 with lift.

The mechanical assembly 3 includes a rotor 5 contributing at least in part to providing the aircraft with lift and/or propulsion. The mechanical assembly 3 may also include a main power transmission gearbox (MGB) 4 that is interposed between the rotor 5 and a power plant that is not shown in the figures.

Specifically, the aircraft is shown in the figures in deliberately incomplete manner in order to avoid pointlessly overcrowding the figures.

The MGB 4, and in particular its bottom 4' may be connected to the carrier structure 2 by a diaphragm 300. Such a diaphragm 300 may be made of metal, for example, and allows the MGB to move vertically and also to pivot about point of the diaphragm 300.

The aircraft 1 has a suspension device 10 that seeks firstly to reduce the vibration transmitted by the mechanical assembly 3 to the carrier structure 2, and secondly to connect the mechanical assembly 3 to the carrier structure 2.

The mechanical assembly 3 includes at least one suspension bar 15, and indeed at least three suspension bars 15 for fastening it to the carrier structure 2. Each suspension bar then extends from a top end 16 to a bottom end 17. Each top end 16 is hinged to the MGB 4, e.g. to a high portion of the MGB 4. Each bottom end 17 is connected indirectly to the carrier structure 2.

Under such circumstances, the suspension device 10 has at least one suspension means 20 interfaced between a suspension bar 15 and the carrier structure 2. For example, the suspension device comprises respective suspension means for each suspension bar hinged both to the carrier structure and also to the bottom end 17 of the corresponding suspension bar.

Each suspension means 20 includes a tuned mass damper 21. The damper 21 has a mass support 25 that caries an inertial mass 30, and indeed the bottom end 17 of a suspension bar. The mass support 25 may comprise at least one lever, at least one bar, . . . .

The mass support 25 then extends longitudinally from a "proximal" segment 27 towards a "distal" segment 26. The distal segment 26 may form a free end. The inertial mass is then carried by the distal segment 26 of the damper.

Furthermore, the proximal segment 27 may be hinged to the suspension bar and to the carrier structure 2. For rotorcraft, the suspension means are provided with a first hinge 35 for hinging the mass support 25 to the carrier structure 2.

Figure 2:
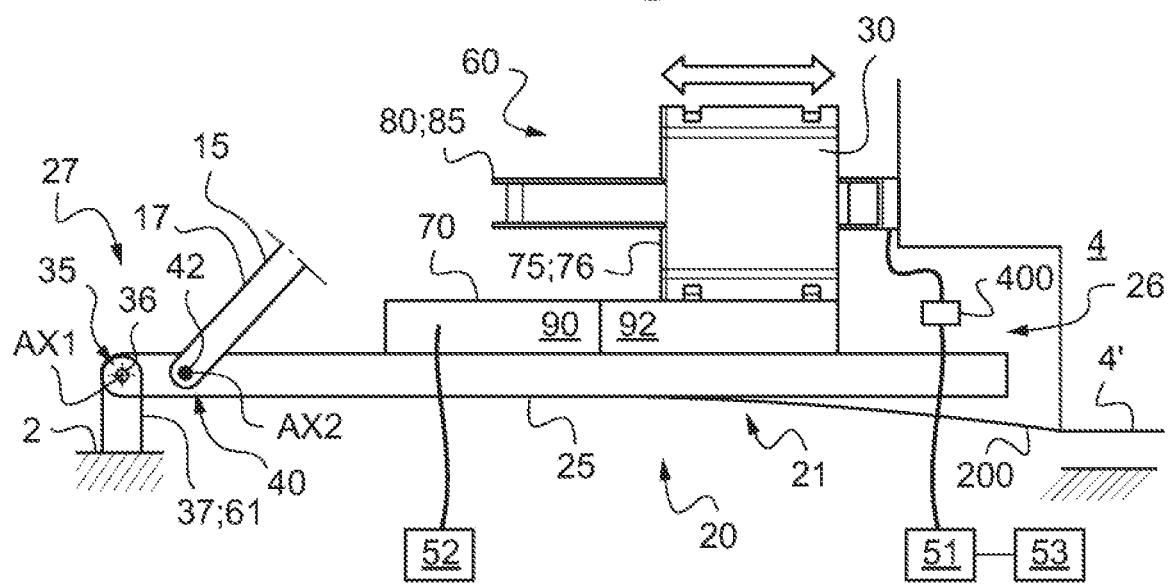
FIG. 2 is a diagram showing suspension means of a suspension device.

With reference to FIG. 2, the first hinge 35 optionally includes a pivot connection enabling the mass support, and thus the inertial mass 30, to pivot about a first direction AX1. Consequently, the first hinge may comprise a fitting 37 suitable for fastening to the carrier structure 2. A first pivot pin 36 of the first hinge can then pass transversely through at least one cheek 61 of the fitting 37.

In addition, the suspension means may comprise a second hinge 40 for hinging a suspension bar 15 to the mass support 25, optionally in the proximity of the first hinge 35. For example, the second hinge 40 is arranged in the proximal segment.

This second hinge 40 may include at least a pivot connection, and possibly a ball-joint connection. The second hinge may optionally be provided with a second connection pin 42. The second connection pin 42 may pass through the mass support 25 and the suspension bar 15. The second connection pin 42 is directed along a second direction AX2 that is optionally parallel to the first direction AX1.

The second hinge 40 is offset relative to the first hinge 35, thus enabling the movement of the inertial mass 30 as caused by relative movement between the carrier structure 2 and the MGB 4 and by a first actuator that is described below to be amplified dynamically.

In addition, the suspension device may include one resilient element 200 for each suspension means that provides the stiffness needed to take up a fraction of the static forces passing through the suspension bars 15. This resilient element 200 is shown in FIG. 2 as a blade that operates in bending, being secured to the damper and resting at its end against the bottom 4' of the MGB. Optionally, the blade may be fastened to the mass support and hinged to the MGB. The blade and the mass support may form two portions of a single mechanical part, the blade presenting bending stiffness that is smaller than the bending stiffness of the mass support.

In other variants, the element 200 may be constituted by a torsion tube mounted in the first hinge 35 between the fitting 37 and the damper 21, or indeed by means of a spring arranged between the damper 21 and the carrier structure, for example.

In a variant, a blade 200 has firstly a first end zone hinged to the carrier structure and to the suspension bar, and secondly a second end zone hinged to the MGB. The mass support is then secured to the blade between these two end zones.

In another aspect, suspension means may comprise at least a first actuator 60 for generating dynamic forces on the damper 21, e.g. in order to control the amplitude and the phase of the oscillatory motion of the damper 21. The first actuator 60 excites the damper 21.

With reference to FIG. 1, the suspension device 10 may include a first actuator 60 integrated in each suspension means. The first actuator 60 may be an actuator that is hydraulic, pneumatic, electromechanical, electromagnetic, or indeed piezoelectric.

The suspension device 10 also includes at least a first calculation means 51. By way of example, the first calculation means may comprise at least a processor, an integrated circuit, a programmable system, a logic circuit, these examples not limiting the scope to be given to the term "first calculation means".

The first calculation means 51 are connected to a measurement system 53 measuring a vibratory response. The measurement system 53 can measure the vibratory response of the carrier structure, or of any other structure, e.g. a structure of a cabin. The vibratory response represents the vibration of the carrier structure and may in particular be in the form of accelerations and/or deformations and/or forces. Under such circumstances, the measurement system 53 may optionally be provided with accelerometers, with force sensors, and/or with strain gauge deformation sensors. For example, accelerometers may be secured to the carrier structure 2.

Each first actuator 60 then communicates with the first calculation means 51, the first calculation means 51 actively controlling the amplitude and the phase of the motion of the damper by generating a first control signal delivered to the first actuator 60, the first control signal being a function of at least one measurement signal coming from the measurement system 53.

For example, the first calculation means 51 apply a minimizing algorithm that receives as input the vibratory response to be minimized as provided by the measurement system 53. As output, the first calculation means 51 deliver a first control signal for controlling a power amplifier 400.

Depending on the order it receives, the power amplifier 400 delivers a particular electric current to at least one member of the first actuator 60. Consequently, the first actuator vibrates the damper 21.

The suspension device may include respective first calculation means for each first actuator 60, or indeed single first calculation means 51 controlling all of the first actuators 60 of the suspension device 10.

Furthermore, the inertial mass 30 is movable longitudinally in translation relative to the mass support 25. Under such circumstances, the inertial mass can slide parallel to a direction in which the mass support 25 extends. This extension direction extends from the proximal segment to the distal segment.

In order to move the inertial mass 30, the suspension device 10 has a second actuator 70. The second actuator 70 is connected to the inertial mass 30 in order to move the inertial mass 30 longitudinally relative to the mass support 25. For example, the second actuator 70 comprises a motor 90 connected by a screw-and-nut system 92 to the inertial mass 30.

Furthermore, the suspension device 10 has second calculation means 52 controlling the second actuator 70 for adjusting the position of the inertial mass 30 relative to the mass support 25 by moving the inertial mass towards or away from an end of the mass support 25. By way of example, the second calculation means 52 may comprise at least a processor, an integrated circuit, a programmable system, a logic circuit, these examples not limiting the scope to be given to the term "second calculation means".

The second calculation means 52 may be connected to a measurement unit 54. The measurement unit 54 can transmit at least one data value to the second calculation means 52 representing a speed of rotation of a rotor 5. For example, the measurement unit 54 includes a speed sensor generating a signal representing the speed of rotation of the rotor.

Under such circumstances, the second calculation means 52 apply an algorithm, e.g. a closed loop algorithm, that provides a second control signal that is transmitted to the second actuator, the second control signal being a function of the speed of rotation of the rotor 5. It is possible to envisage using an open loop algorithm.

The suspension device may have respective second calculation means for each second actuator 70, or indeed single second calculation means 52 controlling all of the second actuators 70 of the suspension device 10.

In addition, at least one first calculation means and at least one second calculation means may form single common calculation means.

Independently of the embodiment and for a particular speed of rotation of the rotor 5, the second actuator 70 positions the inertial mass in a predetermined position relative to the elongate member 25. In the presence of vibration, the first actuator 60 then excites the damper by generating dynamic forces on the damper in order to minimize the vibratory response measured by the measurement system 53.

In another aspect, the first actuator 60 may include a movable member 75 integrated in the inertial mass 30 so as to be constrained to move in translation with the inertial mass 30. Furthermore, the first actuator may include a stationary member 80 co-operating with the movable member 75, the stationary member 80 being arranged not to be fastened directly to the mass support 25. For example, the stationary member may be fastened to the MGB 4 or to a blade that is distinct from the mass support.

The second actuator 70 thus drives part of the movement of the first actuator 60 longitudinally relative to the mass support 25 with the inertial mass 30. More precisely, the second actuator 70 enables the movable member 75 of the first actuator 60 to be moved.

The first actuator may be in the form of an actuator that is hydraulic, pneumatic, electrical, . . . . The first actuator may act on the damper by acting on the mass support or on the inertial mass.

In particular, the first actuator 60 may be in the form of an actuator that is electromagnetic. Thus, the first actuator 60 may have at least one magnetized member 76 and at least one coil 85, the magnetized member 76 or the coil 85 constituting a movable member secured to the inertial mass 30.

In the example of FIG. 2, the magnetized member is a movable member integrated in the inertial mass 30 and it co-operates with a coil. The coil represents a stationary member that is secured to the MGB 4. The coil is then powered electrically under the control of the associated first calculation means.

Figure 8:
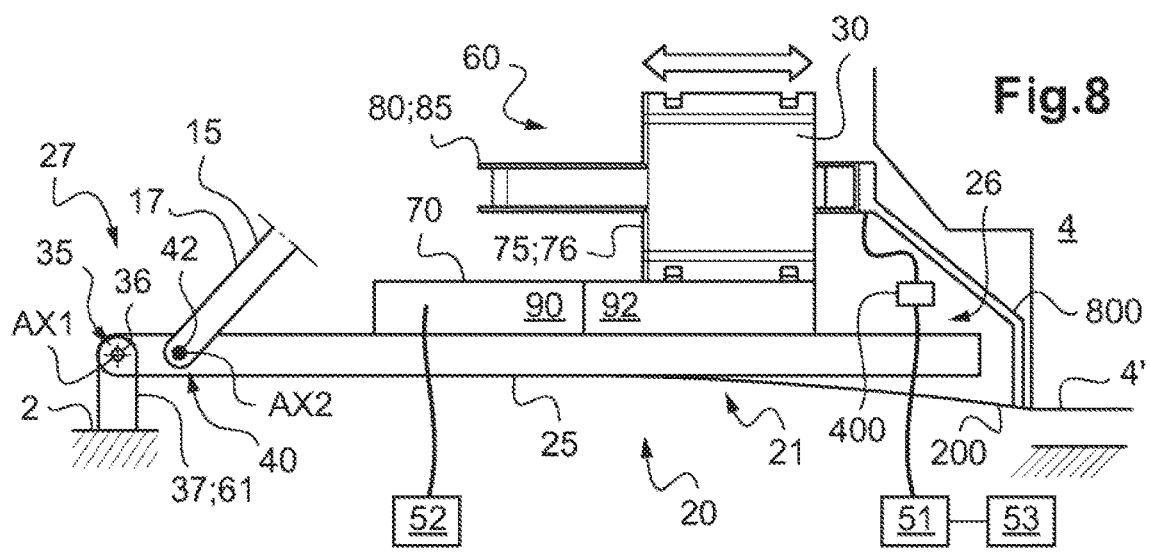
FIG. 8 is a view showing a coil fastened to a blade.

In the example of FIG. 8, the coil is fastened by an attachment 800 to a blade 200, e.g. at or near a connection member 201 of the blade 200 that is hinged to the MGB.

Figure 3:
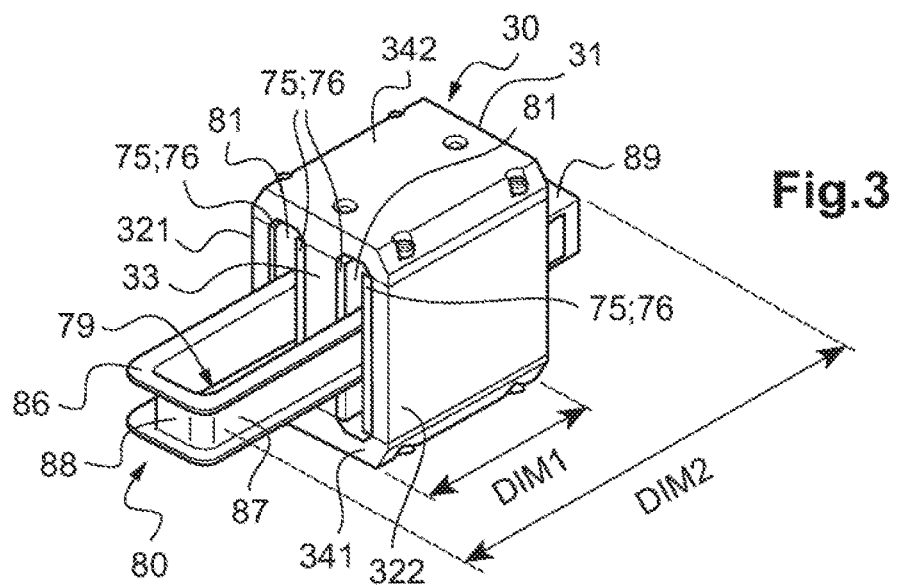
FIGS. 3 and 4 are views showing a first actuator of electromagnetic type.

With reference to FIG. 3, the mass comprises at least one solid 31.

In the context of a first electromagnetic actuator, the solid 31 may include the magnetized member 76. The magnetized member is positioned within the solid so as to face a coil 85.

Under such circumstances, the solid 31 possesses a degree of freedom to move in translation relative to the mass support. The solid is also free to move in longitudinal translation along at least one coil 85.

In order to achieve this result, the solid 31 may present at least one opening 81 having a longitudinal segment 86, 87 of the coil 85 passing therethrough. Such an opening may be defined by walls that described a closed loop around the coil, or that may form an open U-shape, for example.

In particular, the solid 31 may have four walls defining an opening, such as a left side wall, a right side wall, a top wall, and a bottom wall, with the coil extending between these walls.

Optionally, the coil 85 may also describe an O-shaped closed loop around an empty space 79. Under such circumstances, the coil 85 has two longitudinal segments 86 and 87 that are connected together by two transverse branches 88 and 89. Circumferentially, the coil 85 then has a first longitudinal segment 86, a first transverse branch 88, a second longitudinal segment 87, and a second transverse branch 89 that joins the first longitudinal segment 86.

Under such circumstances, the solid 31 may present at least two openings 81 that are separated transversely by a partition 33 of the solid 31. The solid of FIG. 3 thus has a left side wall 321 and a right side wall 322. In addition, the solid presents a top wall 342 and a bottom wall 341 each extending transversely to the left side wall 321 and to the right side wall 322. Finally, the partition 33 extends in elevation from the bottom wall 341 to the top wall 342, being arranged transversely between the left side wall 321 and the right side wall 322.

Thus, a first opening 81 is defined transversely by the left side wall 321 and the partition 33 and in elevation by the top wall 342 and the bottom wall 341. In contrast, the first opening 81 is open longitudinally so as to have a first longitudinal segment 86 pass therethrough.

Likewise, a second opening is defined transversely by the right side wall 322 and the partition 33, and in elevation by the top wall 342 and the bottom wall 341. In contrast, the second opening is longitudinally open to have a second longitudinal segment 87 pass therethrough.

The two longitudinal segments 86 and 87 are arranged transversely on either side of the partition 33.

Each opening 81 may be defined at least in part by at least one magnetized face 76 of the inertial mass 30. For example, at least one wall of the inertial mass is provided with a magnet.

Furthermore, at least one opening 81 extends longitudinally over maximum length DIM1. In addition, the coil 85 extends longitudinally over a minimum longitudinal dimension DIM2. Under such circumstances, the minimum longitudinal dimension DIM2 may be greater than the sum of the maximum length DIM1 plus a predetermined longitudinal stroke for the inertial mass 30.

Figure 4:
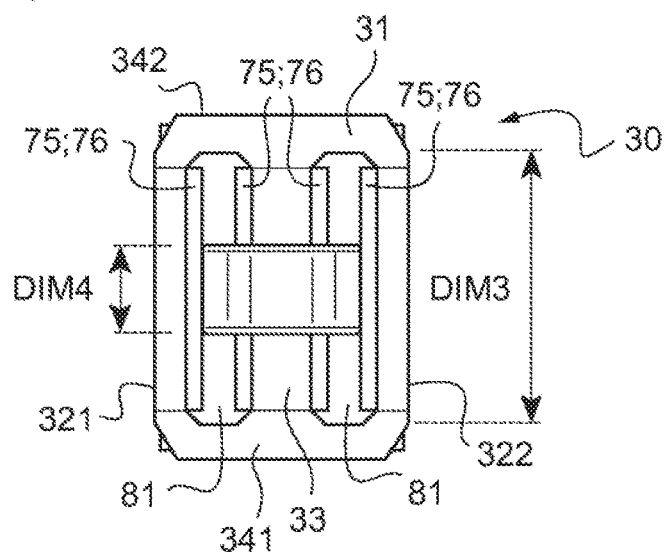

With reference to FIG. 4, at least one opening 81 extends in elevation over a minimum height DIM3, and the coil 85 extends in elevation over a maximum dimension in elevation DIM4. Under such circumstances, the minimum height DIM3 may be greater than the sum of the maximum dimension in elevation DIM4 plus a predetermined stroke in elevation for the mass support 25.

In another aspect, the inertial mass 30 may comprise two solids 31 that co-operate respectively with two coils 85 of the first actuator 60.

Figure 5:
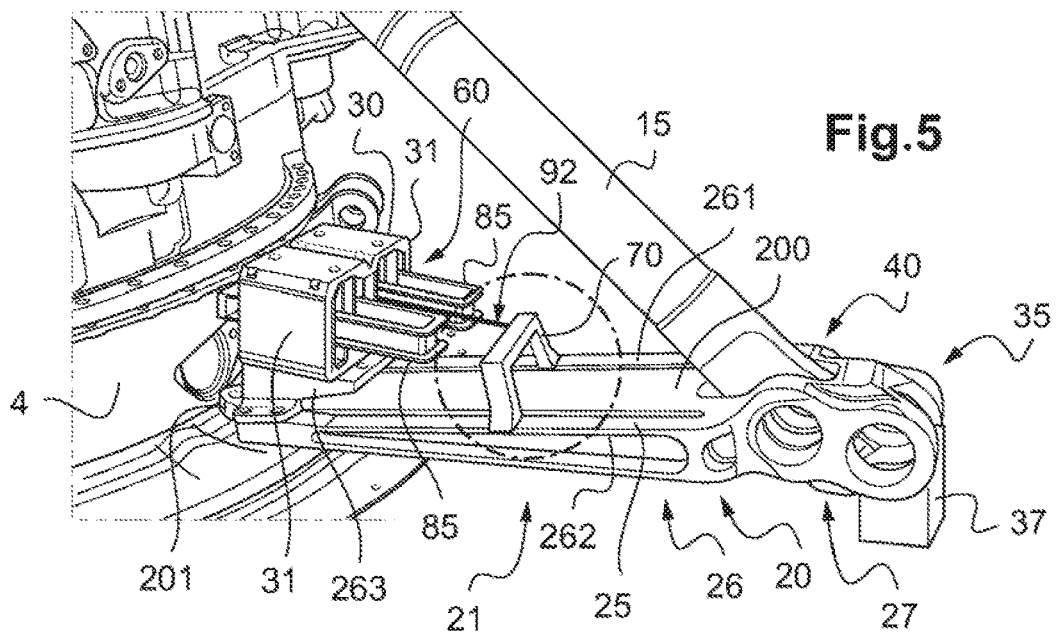
FIGS. 5 and 7 are views showing at least part of the suspension means in three dimensions.

FIG. 5 shows an embodiment of this type. The second actuator 70 is shown diagrammatically. The suspension means may also include a fairing (not shown) arranged around the inertial mass in order to protect the inertial mass from various projections.

In FIG. 5, the suspension means comprise a mass support 25 and a resilient blade 200 that forms a single unitary part.

Figure 6:
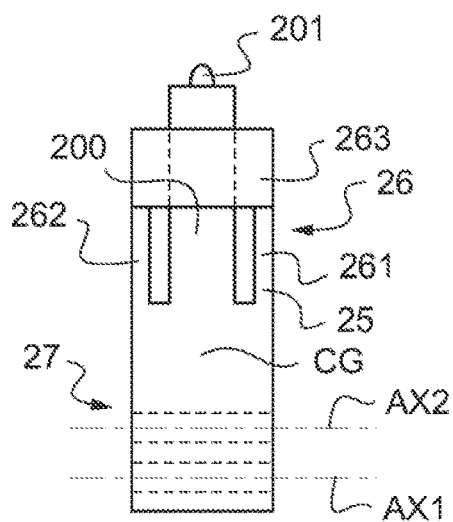
FIG. 6 is a plan view of the FIG. 5 mass support.

With reference to FIG. 6, the distal segment 26 may have to arms 261 and 262 that extend longitudinally from the proximal segment 27. The blade 200 then extends longitudinally from the proximal segment 27 between the two arms 261 and 262.

Under such circumstances, the mass support 25 includes an upside-down U-shaped bridge 263 that extends from one arm 261 to the other arm 262, passing over the blade 200. The inertial mass is then arranged on the bridge 263, for example in sliding manner.

Furthermore, by way of example, the blade 200 includes a connection member 201 hinged to the MGB in order to connect the blade 200 to the MGB.

The two arms 261 and 262 may be rigid, with the blade 200 being flexible relative to the two arms 261, 262.

Figure 7:
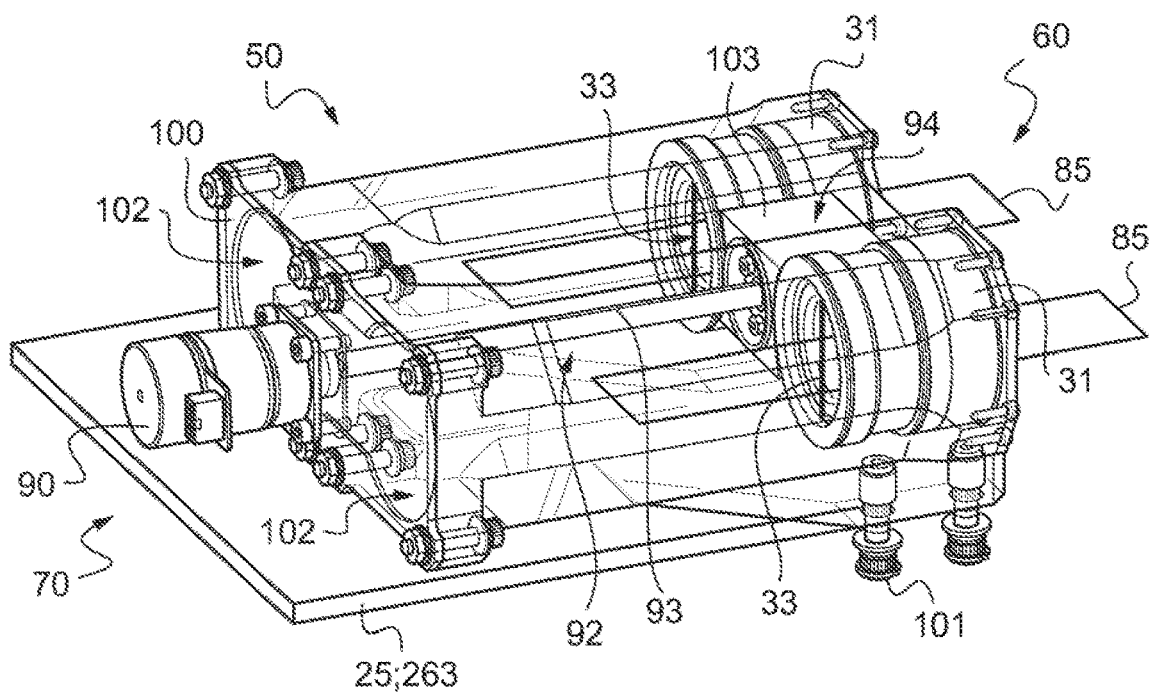

FIG. 7 shows suspension means provided with a heavy member arranged on a distal segment of a mass support 25. For example, the heavy member is arranged on a mass support of the type shown in FIGS. 5 and 6, e.g. being fastened to the bridge 263.

This heavy member has a casing 100 that may be fastened by conventional means to the mass support 25, such as screw fastener means, and, by way of example, pins or studs 101. The casing 100 may possess various members that are fastened to one another.

The casing 100 presents an inside face that defines a volume referred to as the "inside" volume.

This inside volume may have a respective cylindrical space 102 for each solid 31 of the inertial mass 30, e.g. two cylindrical spaces optionally spaced apart transversely by a central space. Under such circumstances, each cylindrical space 102 is physically defined in part by an inside face. Furthermore, the cylindrical space is locally open to the central space.

In addition, the second actuator has a motor 90 fastened to the casing 100. The motor drives a wormscrew 93, e.g. arranged in the central space. A nut 94 is then engaged on the wormscrew 93. The nut 94 is constrained to move in translation and in rotation with each of the solids 31. For example, the nut 94 is arranged in a support 103 that is fastened to the solids 31.

Under such circumstances, when the wormscrew 93 causes the support 103 to move in translation, each solid 31 of the inertial mass is constrained to move in translation within a cylindrical space.

Furthermore, each solid 31 has a coil 85 passing therethrough. Each coil 85 projects outside the casing 100, e.g. so as to be fastened to an MGB.

Naturally, the present invention may be subjected to numerous variations as to its implementation. Although several embodiments are described, it will readily be understood that it is not conceivable to identify exhaustively all possible embodiments. It is naturally possible to envisage replacing any of the means described by equivalent means without going beyond the ambit of the present invention.

What is claimed is:

1. An anti-vibration suspension device for a mechanical assembly, the suspension device provided with at least one suspension means, the suspension means comprising a tuned mass damper that performs swinging motion, the tuned mass damper comprising a mass support and an inertial mass carried by the mass support, the suspension means including at least a first actuator generating dynamic forces to act on a swinging motion of the tuned mass damper, the suspension device having at least first calculation means controlling the first actuator, the first calculation means connected to a measurement system measuring a vibratory response in order to adjust the swinging motion, wherein the inertial mass is movable longitudinally in translation relative to the mass support, the suspension device including a second actuator that is connected to the inertial mass to move the inertial mass longitudinally relative to the mass support, the suspension device including second calculation means controlling the second actuator in order to adjust a position of the inertial mass relative to the mass support, wherein the first actuator is electromagnetic and comprises at least one magnetized member and at least one electric coil, the at least one magnetized member or the at least one coil secured to the inertial mass, the first actuator is configured to excite the tuned mass damper to cause the swinging motion, wherein the inertial mass comprises at least one solid that is longitudinally slidable along the coil, the solid including the at least one magnetized member, the at least one magnetized member positioned facing the at least one coil, wherein the solid presents at least one opening having a longitudinal segment of the coil pass therethrough, wherein the magnetized member comprises a magnetized face of the inertial mass, and the at least one opening is defined at least in part by the magnetized face.

2. The suspension device according to claim 1, wherein the first actuator comprises a movable member and a stationary member, the movable member integrated in the inertial mass so as to be constrained to move in translation with the inertial mass, the stationary member configured for fastening to components other than the suspension means.

3. The suspension device according to claim 1, wherein the at least one coil describes a closed loop around an empty space, the coil presenting two longitudinal segments connected together by two transverse branches, the solid presenting at least two openings separated transversely by a partition of the solid, the two longitudinal segments passing respectively through the two openings and arranged transversely on either side of the partition.

4. The suspension device according to claim 1, wherein the at least one opening extends in elevation over a minimum height and the at least one coil extends in elevation over a maximum dimension in elevation, the minimum height is greater than the sum of the maximum dimension in elevation plus a predetermined stroke in elevation for the mass support.

5. The suspension device according to claim 1, wherein the at least one opening extends longitudinally over a maximum length and the at least one coil extends longitudinally over a minimum longitudinal dimension, the minimum longitudinal dimension is greater than the sum of the maximum length plus a predetermined longitudinal stroke for the inertial mass.

6. An anti-vibration suspension device for a mechanical assembly, the suspension device provided with at least one suspension means, the suspension means comprising a tuned mass damper that performs swinging motion, the tuned mass damper comprising a mass support and an inertial mass carried by the mass support, the suspension means including at least a first actuator generating dynamic forces to act on a swinging motion of the tuned mass damper, the suspension device having at least first calculation means controlling the first actuator, the first calculation means connected to a measurement system measuring a vibratory response in order to adjust the swinging motion, wherein the inertial mass is movable longitudinally in translation relative to the mass support, the suspension device including a second actuator that is connected to the inertial mass to move the inertial mass longitudinally relative to the mass support, the suspension device including second calculation means controlling the second actuator in order to adjust a position of the inertial mass relative to the mass support,
wherein the first actuator comprises at least one magnetized member and at least one electric coil, the at least one magnetized member or the at least one coil secured to the inertial mass,
wherein the inertial mass comprises at least one solid that is longitudinally slidable along the coil, the solid including the at least one magnetized member, the at least one magnetized member positioned facing the at least one coil,
wherein the solid presents at least one opening having a longitudinal segment of the coil pass therethrough,
wherein the magnetized member comprises a magnetized face of the inertial mass, and the at least one opening is defined at least in part by the magnetized face.

7. The suspension device according to claim 6, wherein the second actuator comprises a motor connected by a screw-and-nut system to the inertial mass.

8. The suspension device according to claim 6, wherein the second calculation means are connected to a measurement unit, the measurement unit transmitting at least one data value to the second actuator that represents a speed of rotation of a rotor that excites the mechanical assembly.

9. The suspension device according to claim 6, wherein the first calculation means is configured to apply a minimizing algorithm, the vibratory response is injected into the minimizing algorithm, and the minimizing algorithm delivering a first control signal for controlling the first actuator.

10. The suspension device according to claim 6, wherein the second calculation means is configured to apply an algorithm delivering a second control signal for the second actuator as a function of a speed of rotation of a rotor that excites the mechanical assembly.

11. An aircraft provided with a carrier structure and a mechanical assembly comprising a rotor and a main power transmission gearbox driving the rotor in rotation, the mechanical assembly including at least one suspension bar extending from a high end hinged to the main power transmission gearbox (MGB) to a low end, wherein the aircraft includes a suspension device according to claim 6, at least one low end of a suspension bar is hinged to suspension means of the suspension device.

12. The aircraft according to claim 11, wherein each suspension bar is hinged to suspension means that are specific thereto.

13. An anti-vibration suspension device for a mechanical assembly, the suspension device provided with at least one suspension means, the suspension means comprising a tuned mass damper that performs swinging motion, the tuned mass damper comprising a mass support and an inertial mass carried by the mass support, the suspension means including at least a first actuator generating dynamic forces to act on a swinging motion of the tuned mass damper, the suspension device having at least first calculation means controlling the first actuator, the first calculation means connected to a measurement system measuring a vibratory response in order to adjust the swinging motion, wherein the inertial mass is movable longitudinally in translation relative to the mass support, the suspension device including a second actuator that is connected to the inertial mass to move the inertial mass longitudinally relative to the mass support, the suspension device including second calculation means controlling the second actuator in order to adjust a position of the inertial mass relative to the mass support,
wherein the first actuator comprises at least one magnetized member and at least one electric coil, the at least one magnetized member or the at least one coil secured to the inertial mass,
wherein the inertial mass comprises at least one solid that is longitudinally slidable along the coil, the solid including the at least one magnetized member, the at least one magnetized member positioned facing the at least one coil,
wherein the solid presents at least one opening having a longitudinal segment of the coil pass therethrough,
wherein the at least one coil describes a closed loop around an empty space, the coil presenting two longitudinal segments connected together by two transverse branches, the solid presenting at least two openings separated transversely by a partition of the solid, the two longitudinal segments passing respectively through the two openings and arranged transversely on either side of the partition.

14. The suspension device according to claim 13, wherein the first actuator comprises a movable member and a stationary member, the movable member integrated in the inertial mass so as to be constrained to move in translation with the inertial mass, the stationary member configured for fastening to components other than the suspension means.

15. The suspension device according to claim 6, wherein the inertial mass comprises two solids co-operating respectively with two coils of the first actuator.

16. The suspension device according to claim 6, wherein the first actuator comprises a movable member and a stationary member, the movable member integrated in the inertial mass so as to be constrained to move in translation with the inertial mass, the stationary member configured for fastening to components other than the suspension means.

17. The suspension device according to claim 6, wherein the first actuator does not displace a mass.

18. The suspension device according to claim 6, wherein the at least one coil describes a closed loop around an empty space, the coil presenting two longitudinal segments connected together by two transverse branches, the solid presenting at least two openings separated transversely by a partition of the solid, the two longitudinal segments passing respectively through the two openings and arranged transversely on either side of the partition.

19. The suspension device according to claim 6, wherein the at least one opening extends in elevation over a minimum height and the at least one coil extends in elevation over a maximum dimension in elevation, the minimum height is greater than the sum of the maximum dimension in elevation plus a predetermined stroke in elevation for the mass support.

20. The suspension device according to claim 6, wherein the at least one opening extends longitudinally over a maximum length and the at least one coil extends longitudinally over a minimum longitudinal dimension, the minimum longitudinal dimension is greater than the sum of the maximum length plus a predetermined longitudinal stroke for the inertial mass.

\* \* \* \* \*